Patented July 8, 1941

2,248,735

UNITED STATES PATENT OFFICE 2,248,735

METHOD OF PRODUCING SPONGE IRON AND REDUCING AGENT THEREFOR

Joseph E. Batie, Detroit, Mich., assignor to Kelsey-Hayes Wheel Company, Detroit, Mich., a corporation of Delaware No Drawing. Application January 15, 1940, Serial No. 313,988

7 Claims. (Cl. 75—33)

The invention relates to the reduction of metal oxides at temperatures below the fusion point whereby metal sponge is obtained. More particularly, the invention relates to a process of producing sponge iron from iron oxides or ores containing the same.

One of the objects of the invention is to provide an improved solid reducing agent which, when associated with the metal oxides at reaction temperatures, is effective in reducing the oxides to produce sponge metal.

Another object is to obtain an effective carbonaceous reducing agent at relatively low cost.

A further object is to provide an addition agent for the carbonaceous material by means of which low cost materials, such as coke, are made as effective for the reduction of metal oxides as higher priced commercially available carbonaceous materials.

It is known, for example, that wood charcoal is an effective reducing agent adapted for reducing iron oxide to sponge iron but it has the disadvantage that it is relatively high priced compared with coke and other commercially available carbonaceous materials. These latter materials, however, when used in their commercially available form are not nearly so good as charcoal.

According to my invention I combine with coke or other carbonaceous material an addition agent which has the property of liberating a certain amount of oxygen when it is heated to the reaction temperatures capable of reducing the metal oxides. The oxygen acts as an accelerator, starting the production of carbon monoxide from the carbonaceous material which in turn reacts with the oxygen in the metal oxide reducing it to the metallic state and forming carbon dioxide in the process.

According to one embodiment of my invention, I use as a reducing material ordinary coke breeze which is intimately mixed with a small amount of sodium nitrate. Preferably the amount of sodium nitrate is such that it will liberate at reaction temperatures substantially the same amount of free oxygen as is normally contained in the occluded air in wood charcoal. For example, I find that 100 parts of coke breeze and 8 parts of sodium nitrate or potassium nitrate makes a very satisfactory reducing agent for the production of sponge iron.

Instead of using coke breeze, I may also use any other carbonaceous material such as petroleum coke, anthracite breeze, bituminous coal, semi-hard coals, anthracite coal and other similar carbonaceous materials. Other oxidizing agents which come within the purview of this invention include mercuric oxide, manganese dioxide, red lead, potassium permanganate, potassium chlorate and similar materials which at reaction temperatures liberate sufficient oxygen to initiate the formation of reducing gases from the carbonaceous material.

My improved reducing agent may be used for the production of sponge iron from iron oxide either by the batch process or by a continuous process. One type of apparatus for producing sponge iron by a continuous process is shown in my copending application, Serial No. 313,987, filed January 15, 1940. The iron oxide and the reducing agent may either be mixed together or, alternatively, the iron oxide may be distributed in a layer between upper and lower layers of the solid reducing agent. In either case, the carbonaceous material is preferably in a finely divided state and is intimately comixed with the sodium nitrate or other oxidizing agent. The materials are placed in a furnace and heated to reaction temperatures and held at such temperatures for a sufficient length of time to completely remove the oxygen from the iron oxide, thereby reducing the same to the metallic state. A suitable temperature is approximately 1800° F., but under some circumstances higher temperatures may be used up to approximately 2200° F. thereby increasing the speed of the reaction.

It has been found that with the improved reducing agents prepared in accordance with my invention that a rapid reduction of the iron oxide is obtained and the sponge iron formed in the process is of a high degree of purity.

What I claim as my invention is:

1. A reducing agent for low temperature reduction of iron oxide comprising a finely divided mixture of approximately 100 parts of coke breeze and 8 parts of potassium nitrate.

2. A reducing agent for low temperature reduction of iron oxide comprising a carbonaceous material which is lacking sufficient oxygen for the efficient reduction of iron oxide and a sufficient amount of a compound adapted to liberate oxygen at reaction temperatures to supply said deficiency.

3. A reducing agent for low temperature reduction of iron oxide comprising coke breeze and a sufficient amount of a compound adapted to give up oxygen at reaction temperatures to enhance the formation of sponge iron.

4. A reducing agent for low temperature reduction of iron oxide comprising coke breeze and a sufficient amount of an alkali nitrate to enhance the formation of sponge iron.

5. The method of producing sponge iron which comprises heating iron oxide to reacting temperatures in the presence of carbonaceous material which is lacking sufficient oxygen for the efficient reduction of iron oxide and a sufficient amount of a compound adapted to liberate oxygen at reaction temperatures to supply said deficiency.

6. The method of producing sponge iron which comprises heating iron oxide to reacting temperatures in the presence of coke breeze and a sufficient amount of a component adapted to give up oxygen at reaction temperatures to enhance the formation of sponge iron.

7. The method of producing sponge iron which comprises heating iron oxide to reacting temperatures in the presence of coke breeze and a sufficient amount of an alkali nitrate to enhance the formation of sponge iron.

JOSEPH E. BATIE.